United States Patent
Natsuyama et al.

(10) Patent No.: US 7,297,314 B2
(45) Date of Patent: Nov. 20, 2007

(54) FLUIDIZED BED DEVICE

(75) Inventors: Susumu Natsuyama, Osaka (JP); Nobuyuki Watanabe, Kawanishi (JP); Kazuyoshi Otaki, Akashi (JP); Kenji Nagatsuma, Saitama (JP); Takuya Nagato, Takarazuka (JP); Yoshiyuki Kanoh, Himeji (JP); Ran Tabata, Nishinomiya (JP); Makoto Kobayashi, Amagasaki (JP)

(73) Assignee: Kabushiki Kaisha Powrex, Osaka-Fu (JP)

( * ) Notice: Subject to any disclaimer, the term of this patent is extended or adjusted under 35 U.S.C. 154(b) by 0 days.

(21) Appl. No.: 10/526,248

(22) PCT Filed: Jul. 30, 2003

(86) PCT No.: PCT/JP03/09712

§ 371 (c)(1),
(2), (4) Date: Aug. 23, 2005

(87) PCT Pub. No.: WO2004/022217

PCT Pub. Date: Mar. 18, 2004

(65) Prior Publication Data

US 2006/0104871 A1     May 18, 2006

(30) Foreign Application Priority Data

Sep. 4, 2002   (JP) .............................. 2002-259096
Jun. 27, 2003  (JP) .............................. 2003-184917

(51) Int. Cl.
*B01J 8/18*   (2006.01)
*B01J 2/16*   (2006.01)
*B32B 5/02*   (2006.01)
*A61K 9/50*   (2006.01)

(52) U.S. Cl. .......... 422/139; 422/147; 96/150; 34/249; 427/2.15; 118/309; 23/313 FB (58) Field of Classification Search ............ 422/227, 422/224, 225, 228, 139, 147, 145, 143; 23/313 FB; 118/309; 34/249; 96/150; 427/2.15
See application file for complete search history.

(56) References Cited

U.S. PATENT DOCUMENTS 5,227,136 A * 7/1993 Hanify et al. ............... 422/225
5,284,678 A * 2/1994 Hirschfeld et al. ......... 427/212
5,779,995 A * 7/1998 Witt et al. .................. 422/215
5,779,996 A * 7/1998 Stormo ....................... 422/227

FOREIGN PATENT DOCUMENTS

| JP | 01-284329  | 11/1989 |
| JP | 07-008785  | 1/1995  |
| JP | 2000-062277 | 2/2000 |

* cited by examiner

*Primary Examiner*—Glenn Caldarola
*Assistant Examiner*—Kaity Handal
(74) *Attorney, Agent, or Firm*—J.C. Patents (57) ABSTRACT

A fluidized bed apparatus has a rotary rotor 4 arranged at the bottom center thereof, a disintegrator mechanism 5 arranged above the rotary rotor 4, and a cylindrical draft tube 6 installed above the disintegrator mechanism 5. A fluidizing gas jetted from a gas dispersion plate 3 causes powder particles P in a processing container 1 to form a fluidized bed in which they circulate so as to ascend through the gap between the outer periphery of the rotary rotor 4 and the bottom inner wall of the processing container 1, the space between the disintegrator mechanism 5 and the inner wall of the processing container 1, and the space between the outer periphery of the draft tube 6 and the inner wall of the processing container 1, and descend through the inner portion of the draft tube 6.

6 Claims, 8 Drawing Sheets

FLUIDIZED BED DEVICE

BACKGROUND OF THE INVENTION

The present invention relates to a fluidized bed apparatus used in the production of fine particles, granules, etc. of pharmaceutical preparations, agricultural chemicals, food products, etc., and more specifically to a fluidized bed apparatus suitable for coating processing on particles of a fine particle size or granulation processing of particles with a fine final particle size.

A fluidized bed apparatus generally performs granulation or coating by spraying a spray solution (coating solution, binder solution, etc.) from a spray nozzle while forming a fluidized bed of powder particles within a processing container by using fluidizing gas introduced from the bottom of the processing container. Of the fluidized bed apparatuses of this type, those involving rolling, jetting, stirring, etc. of the powder particles are referred to as a compound fluidized bed apparatus.

Figure 8:
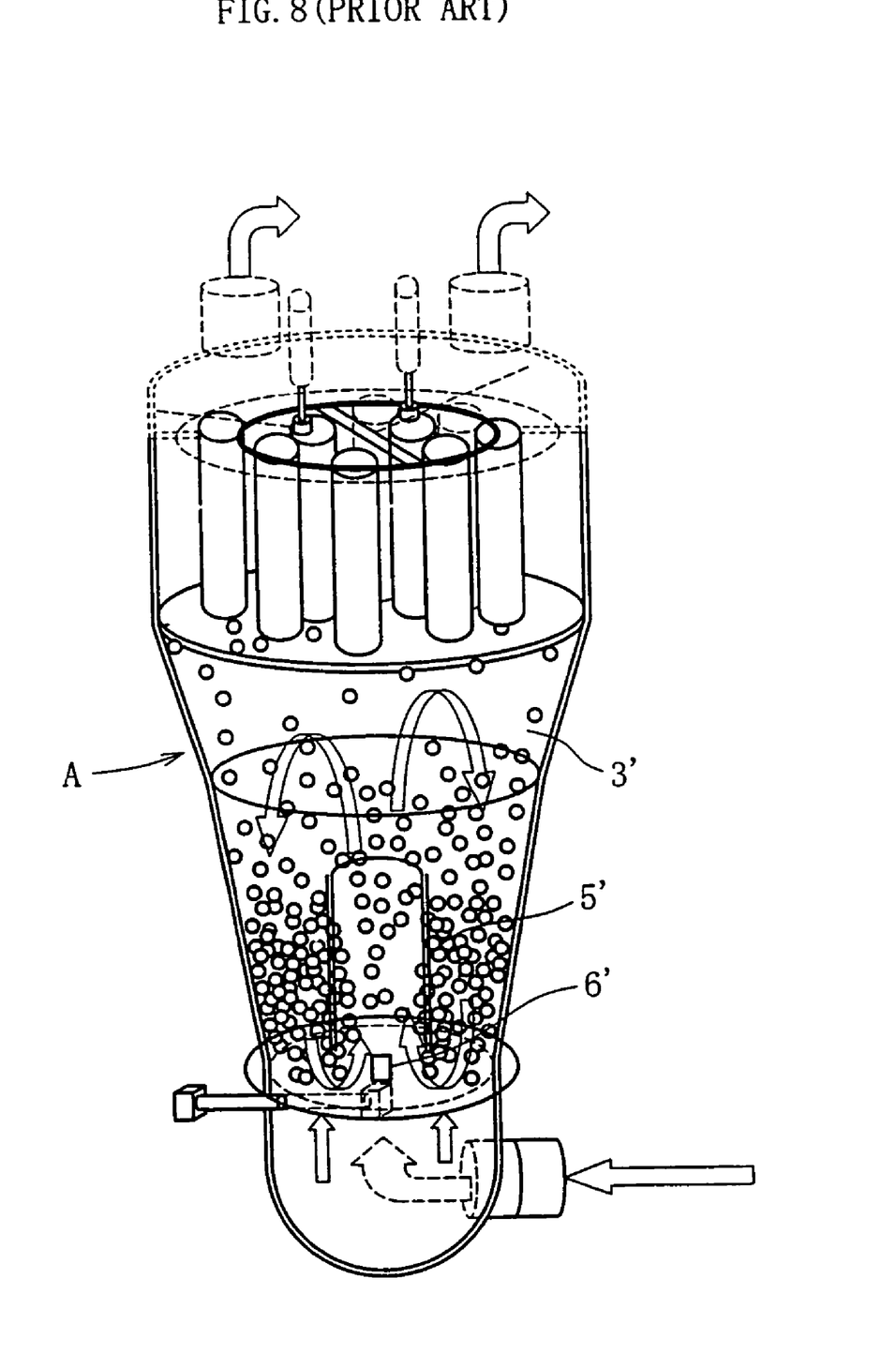
FIG. 8 is a view schematically illustrating an example of a conventional fluidized bed apparatus.

FIG. 8 shows a fluidized bed apparatus (commonly called "Wurster type fluidized bed apparatus") equipped with a draft tube 5'. The fluidized bed apparatus has the draft tube 5' installed in the central portion of a processing container 3'. Particles are carried by an air current ascending within the tube 5', thus generating an upward flow (jet layer) of the particles. A spray solution of film agent, pharmaceutical agent, or the like is sprayed upwardly from a spray nozzle 6' installed at the bottom center of the processing container 3' toward the particles in the tube 5'. The fluidized bed apparatus of this type, which allows a large amount of particles to be sent into the coating zone at high speed, is relatively free from the spray dry phenomenon or secondary agglomeration of particles, thus enabling coating processing on fine particles at good yield (refer to JP 2000-62277 A, for example).

In a fluidized bed apparatus, a generally adopted means for controlling the cohesiveness between particles, which results from the stickiness or tackiness of the base components of a spray solution, is to set (during the coating operation) the spray rate of the spray solution to a low level where no secondary agglomeration will occur between the particles, or to set (during the granulating operation) the spray rate of the spray solution to a low level where the particles do not form an aggregate due to excessive agglomeration. However, this involves many problems in terms of product manufacture costs, such as the prolonged processing time due to the low spray rate of the spray solution or the necessity of performing numerous experiments to grasp the characteristics of the spray solution prior to setting the spray rate of the spray solution.

Often adopted as another such means is to disperse agglomerated particles by the jet force of compressed air. However, to attain the anticipated effect, it is necessary to spray considerably high-pressure compressed air from a number of spray nozzles, which disadvantageously increases the consumption of air not contributing to the drying of particles.

Further, it has been practically difficult, even by optimizing the spray rate of the spray solution or by dispersing particles with compressed air, to effect coating processing on particles having a fine particle size, for example, fine particles with a particle size of 100 µm or less, particularly those with a particle size of 50 µm or less, without involving secondary agglomeration, or to produce product particles with a sharp particle size distribution in granulation processing for obtaining the above-mentioned particle sizes as the final particle sizes.

SUMMARY OF THE INVENTION

It is an object of the present invention to provide a fluidized bed apparatus capable of performing coating processing on particles with a fine particle size or granulation processing of particles with a fine final particle size with efficiency and at high yield.

To attain the above object, according to the present invention, there is provided a fluidized bed apparatus including a processing container, a draft tube arranged inside the processing container, and a disintegrator mechanism for dispersing agglomerates of powder particles by a mechanical disintegration force, in which: a fluidizing gas introduced from a bottom portion of the processing container causes powder particles in the processing container to form a fluidized bed in which the powder particles circulate so as to ascend through a space between an inner wall of the processing container and the draft tube and descend through an inner portion of the draft tube; and agglomerates of the powder particles descending through the inner portion of the draft tube are dispersed by the disintegrator mechanism.

The term "mechanical disintegration force" as used herein refers to a force such as an impact force, a repulsion force, a crushing force, a shearing force, a stirring force, or a friction force applied to the powder particles due to the motion of components constituting the disintegrator mechanism. As the disintegrator mechanism for dispersing agglomerates of powder particles by such a mechanical disintegration force, there may be employed, for example, those equipped with an impeller having a disintegrator blade or those further equipped with a screen arranged at a predetermined gap from the disintegrator blade of the impeller. Further, those equipped with a rotor and a stator each having a plurality of concentrically arranged teeth may also be employed as the above-described disintegrator mechanism. Such a disintegrator mechanism equipped with a rotor and a stator is also referred to as the "homogenizer" and generally used in a dispersing emulsifier ("Universal Mixer SR Series" manufactured by POWREX CORPORATION, for example). Alternatively, as the above disintegrator mechanism, there may also be adopted one having a large number of pins provided to relatively rotating disks (a so-called pin mill), one having a disk-shaped hammer plate with a large number of swing hammers and a lining plate with an involuted depression ("Powrex Atomizer" manufactured by POWREX CORPORATION, for example), and the like.

Further, the apparatus may be provided with a rotary rotor for sending the powder particles having passed the disintegrator mechanism to an upward current of the fluidizing gas by centrifugal force.

Further, the apparatus may be provided with a spray nozzle for spraying the spray solution toward the powder particles fluidizing and circulating inside the processing container. In that case, the spray nozzle may be arranged so as to spray the spray solution to the fluidized bed of powder particles downwardly from its top (so-called top spray), or to spray the spray solution to the powder particles having passed the disintegrator mechanism.

The present invention provides the following effects.

(1) The disintegrator mechanism disperses the secondary agglomerates or aggregates of powder particles, whereby coating processing on particles with a fine particle size or granulation processing of particles with a fine finish particle size can be effected with good efficiency and at high yield.

(2) The flow of powder particles fluidizing and circulating within the processing container is guided inside and outside of the draft tube, whereby the flow of the powder particles in the processing container is stabilized, making it possible to perform the cycle of disintegration, spraying of the spray solution, and drying in a stable manner within the single apparatus.

(3) Since the cohesiveness of powder particles during the operation can be controlled by the disintegrator mechanism, it is no longer necessary to expend much effort and time to compute the balance between the drying capacity by the fluidizing gas and the spray rate of the spray solution or to grasp the characteristics of the spray solution, thereby simplifying the production process. Further, the problem of increased consumption of air not contributing to the drying of particles, which arises when adopting the prior art means with which agglomerated particles are dispersed with the jet force of compressed air, does not occur.

(4) The disintegrator mechanism equipped with the impeller and the screen does not exert such a disintegration force as to disintegrate single particles but is capable of disintegrating solely the secondary agglomerates of particles or aggregates of excessively agglomerated particles. Accordingly, there is relatively little generation of fines due to abrasion wear of the particles, thus ensuring a high product yield. Further, the target finish particle size can be readily controlled through appropriate selection of the configuration and RPM of the screen or impeller. Further, the friction effect is imparted to the particles in the gap space between the impeller and the screen, whereby, in the case of wax coating on the particles, for example, the so-called dry coating process can be performed by gradually adding small amounts of wax powder as it is in the form of powder while allowing nuclear particles to fluidize and circulate within the processing container.

(5) The disintegrator mechanism equipped with the rotor and the stator each having a plurality of concentrically arranged teeth provides a high disintegration effect on the secondary agglomerates of particles or aggregates of excessively agglomerated particles, and further exerts strong suction/extrusion action on powder particles, whereby there is relatively little build-up of particles in the peripheral portions of the disintegrator mechanism, thereby further facilitating good fluidization and circulation of powder particles in the processing container.

DETAILED DESCRIPTION OF THE INVENTION

Hereinbelow, an embodiment of the present invention is described with reference to the drawings.

Figure 1:
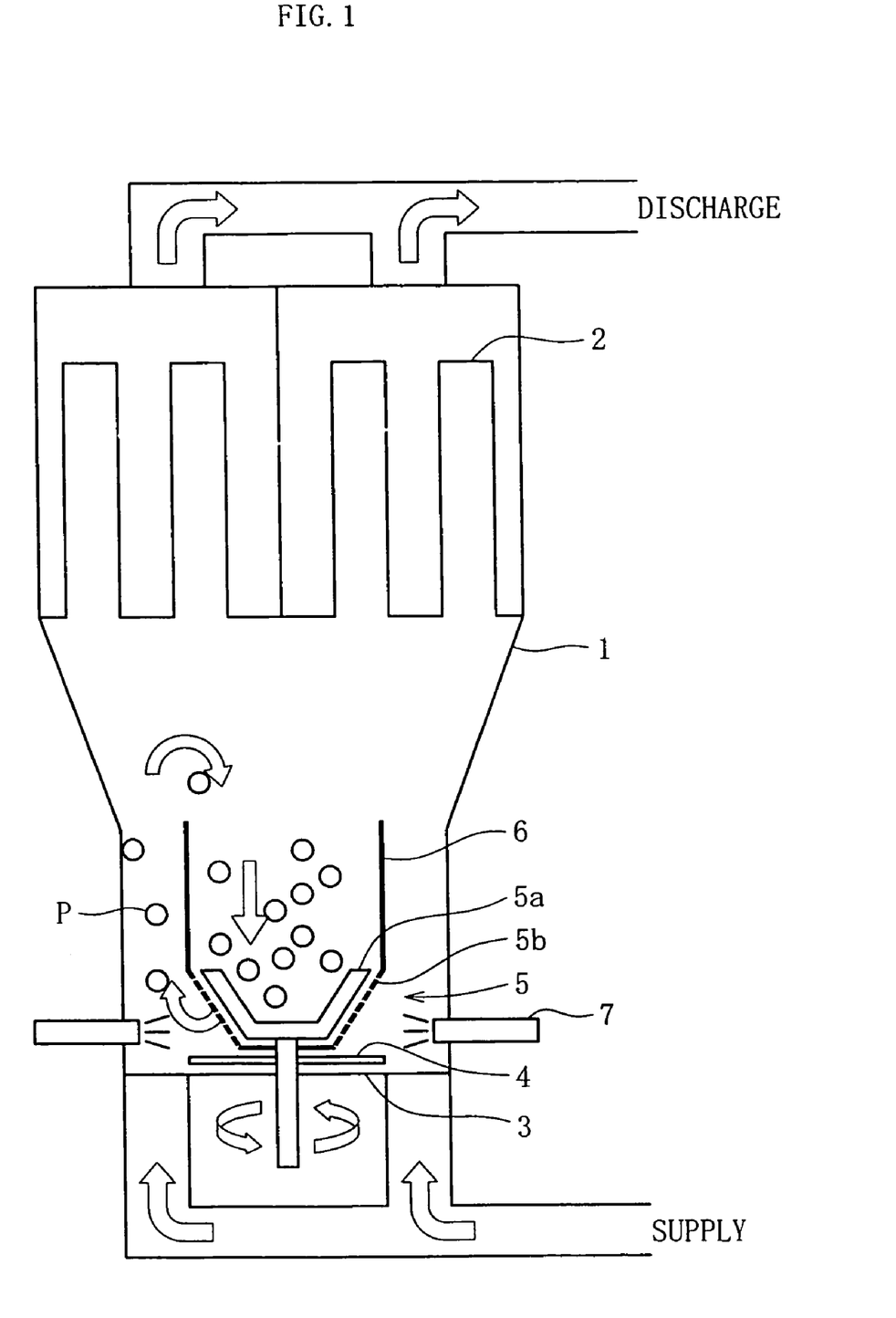
FIG. 1 is a sectional view conceptually illustrating the overall construction of a fluidized bed apparatus according to an embodiment of the present invention.

FIG. 1 conceptually illustrates the overall construction of a fluidized bed apparatus according to this embodiment.

A processing container 1 has a conical upper part and a cylindrical lower part, for example (or a cylindrical upper part and a conical lower part), with a filter system 2 installed in the space above the processing container 1 and a gas dispersion plate 3 consisting of a porous plate such as punching metal arranged at its bottom. Further, a rotary rotor 4 is arranged at the bottom center of the processing container 1, a disintegrator mechanism 5 is arranged above the rotary rotor 4, and a cylindrical draft tube 6 is installed above the disintegrator mechanism 5. Further, one or a plurality of spray nozzles 7 are arranged by the side of the disintegrator mechanism 5.

Figure 2:
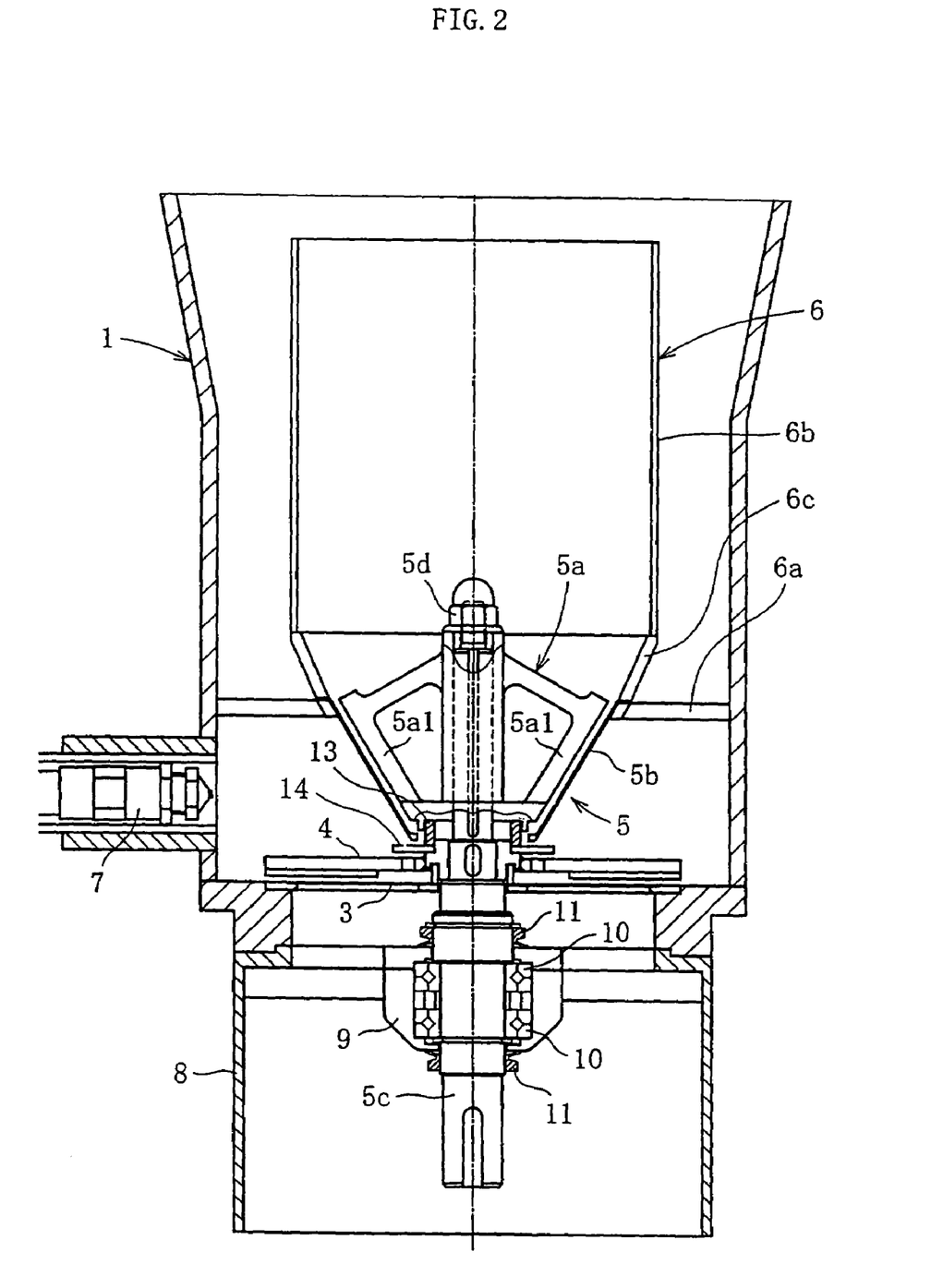
FIG. 2 is an enlarged sectional view showing a lower part of a processing container.

FIG. 2 shows the lower part of the processing container 1.

The draft tube 6 is fixed to the side wall of the processing container 1 through the intermediation of an attachment member 6a together with a screen 5b of the disintegrator mechanism 5. The draft tube 6 is open at its upper end portion. For example, an upper part 6b of the draft tube 6 has a cylindrical configuration, and a lower part 6c thereof has a conical configuration with a downwardly decreasing diameter.

The disintegrator mechanism 5 is equipped with an impeller 5a having a plurality of, for example, two disintegrator blades 5a1, and the screen (sieve) 5b having a large number of pores with a predetermined diameter. The screen 5b has a conical configuration with a downwardly decreasing diameter and fitted in conformity with the lower end portion of the draft tube 6. The impeller 5a is detachably fixed onto an upper part of a rotary shaft 5c with a bolt 5d, with a predetermined gap being provided between the side edges of the disintegrator blades 5a1 and the inner surface of the screen 5b. The rotary shaft 5c extends through the center portion of the gas dispersion plate 3 to a position below the processing container 1 and is rotatably supported, through the intermediation of bearings 10, by a housing 9 fixed onto a stand 8 on which the processing container 1 rests. It is to be noted that the inside of the housing 9 is sealed by seal members 11. Further, sealing between the rotary shaft 5c and the gas dispersion plate 3 is effected, by a labyrinth seal.

A spacer 13, an air cap 14, and the rotary rotor 4 are fixed to a portion of the rotary shaft 5c which is below the impeller 5a. The rotary rotor 4 is arranged at a predetermined gap from the upper surface of the gas dispersion plate 3 so as to cover the upper surface of the gas dispersion plate 3.

The rotary shaft 5c is coupled to an appropriate rotation drive means (not shown) to be rotationally driven by the rotation drive means. As the rotary shaft 5c rotates, the impeller 5a, the air cap 14, and the rotary rotor 4 all rotate integrally at high speed. It is to be noted that the lower end opening of the screen 5b constitutes a labyrinth seal (or a contact seal) between the impeller 5a and the air cap 14. The impeller 5a and the rotary rotor 4 may be rotated at different speeds (For instance, the rotation speed of the rotary rotor 4 is set lower than the rotation speed of the impeller 5a). In this case, a double-shaft structure may be employed, with the rotary shaft of the impeller 5*a* serving as the inner shaft and the rotary shaft of the rotary rotor 4 serving as the outer shaft, the respective shafts being coupled to rotation drive means at different rotation speeds.

The spray nozzle 7 is arranged so as to spray the spray solution in the tangential direction with respect to the circle of a predetermined radius concentric with the axis of the rotary shaft 5*c* (That is, it is a so-called tangential spray).

Fluidizing gas (for example, hot air) is fed into the processing container 1 through the gas dispersion plate 3. The fluidizing gas jetted into the processing container 1 through the gas dispersion plate 3 passes through the gap between the lower surface of the rotary rotor 4 and the upper surface of the gas dispersion plate 3 and ascends through the gap between the outer periphery of the rotary rotor 4 and the bottom inner wall of the processing container 1. The fluidizing gas then further continues its ascent through the space between the disintegrator mechanism 5 and the inner wall of the processing container 1 and through the space between the outer periphery of the draft tube 6 and the inner wall of the processing container 1 before reaching the filter system 2. Then, after filtration of fines etc. by the filter system 2, the fluidizing gas is discharged to the exterior of the apparatus. Further, the fanning effect due to the rotation of the impeller 5*a* of the disintegrator mechanism 5 generates an air current directed from the inside toward the outside of the screen 5*b*. As a result, the pressure within the draft tube 6 becomes a negative pressure that is only slightly below the pressure in surrounding areas, achieving the effect whereby the upper end portion of the draft tube 6 sucks in powder particles present in its surroundings. To further enhance this suction effect, a vane-like portion capable of producing an up-to-down flow of air current as it rotates may be formed integrally with the impeller 5, or the vane-like portion may alternatively be fitted onto the impeller 5*a* or the rotary shaft 5*c* thereof.

As shown in FIG. 1, powder particles P charged into the processing container 1 ascend while carried by an upward current through the gap between the outer periphery of the rotary rotor 4 and the bottom inner wall of the processing container 1, the space between the disintegrator mechanism 5 and the inner wall of the processing container 1, and the space between the outer periphery of the draft tube 6 and the inner wall of the processing container 1. After thus having ascended to a certain level within the processing container 1, the powder particles P then descend by their own weights, and are further subjected to the above-mentioned suction effect before flowing into the draft tube 6. The powder particles P thus having flown into the draft tube 6 descend within the draft tube 6, reaching the disintegrator mechanism 5 where they are subjected to the centrifugal effect due to the rotation of the impeller 5*a*, and as they pass through the screen 5*b* having a large number of predetermined-diameter pores, the portions of the powder particles P forming secondary agglomerates or aggregates are disintegrated into single particles or particles of a predetermined diameter.

The powder particles P having passed the disintegrator mechanism 5 are returned to the above-mentioned upward current again by the centrifugal effect of the rotary rotor 4. In this way, the powder particles P in the processing container 1 form a fluidized bed in which the powder particles P are suspended and circulate so as to ascend through the gap between the outer periphery of the rotary rotor 4 and the bottom inner wall of the processing container 1, the gap between the disintegrator mechanism 5 and the inner wall of the processing container 1, and the gap between the outer periphery of the draft tube 6 and the inner wall of the processing container 1, and then descend through the interior portion of the draft tube 6.

The powder particles P thus returned to the above-described upward current by the centrifugal effect of the rotary rotor 4 are sprayed with the spray solution from the spray nozzle 7 at this position. The mist of the spray solution sprayed from the spray nozzle 7 moistens the powder particles P, and at the same time, the base coating material contained in the spray solution adheres to the surface of the powder particles P (during coating processing), or plural particles agglomerate due to the base binder material contained in the spray solution into a particle of a predetermined diameter (during granulation processing). Thereafter, the powder particles P thus sprayed with the spray solution are dried as they ascend through the space between the outer periphery of the draft tube 6 and the inner wall of the processing container 1, and flow into the draft tube 6 again.

As described above, the cycle of disintegration, spraying of the spray solution, and drying is repeated, thereby enabling coating processing on single particles of a fine particle size or granulation processing of particles with a fine final particle size. In the case of coating processing, for instance, it is possible to form a coating film on single particles (nuclear particles) having a particle size of 100 μm or less, particularly those having a particle size of 50 μm or less (on the order of 10 μm, for example), without giving rise to secondary agglomeration. Further, in the case of granulation processing, it is possible to produce particles having a final particle size of 100 μm or less, particularly those having a final particle size of 50 μm or less, with a sharp particle size distribution and at good yield. It is to be noted that the spray nozzle 7 may be placed so as to spray the spray solution in the up-to-down direction with respect to the fluidized bed of the powder particles (in the manner of so-called top spray).

FIG. 3 shows a fluidized bed apparatus according to another embodiment of the present invention. This embodiment adopts a disintegrator mechanism 15 equipped with a rotor 15*a* and a stator (outer stator 15*b*, an inner stator 15*c*) each having a plurality of teeth.

As shown in FIG. 4, the rotor 15*a* includes a disk-shaped base portion 15*a*1 and multiple comb-teeth 15*a*2 extending upward integrally from the upper surface of the base portion 15*a*1. Formed at the center portion of the base portion 15*a*1 is a boss portion 15*a*1 that is key-coupled to the rotary shaft 5*c*, for example. Formed in the outer peripheral portion of the upper surface of the base portion 15*a*1 is a tapered surface 15*a*12 inclined toward the lower surface side. The comb-teeth 15*a*2 consist of outer teeth 15*a*21, intermediate teeth 15*a*22, and inner teeth 15*a*23 that are concentrically arranged. The outer teeth 15*a*21, the intermediate teeth 15*a*22, and the inner teeth 15*a*23 are arranged in a scattered formation at predetermined circumferential intervals from one another. As shown in FIG. 3, the rotor 15*a* is coupled to the rotary shaft 5*c*, with its lower surface abutted on the upper surface of the rotary rotor 4.

As shown in FIG. 5, the outer stator 15*b* includes multiple teeth 15*b*1 arranged at a predetermined circumferential interval, a lower annular portion 15*b*2 integrally connecting the lower ends of respective teeth 15*b*1, an upper annular portion 15*b*3 integrally connecting the upper ends of respective teeth 15*b*1, and a flange 15*b*4 provided integrally with the upper annular portion 15*b*3. A window-like space 15*b*5 is formed between circumferentially adjacent teeth 15*b*1, 15*b*1.

Figure 6A:
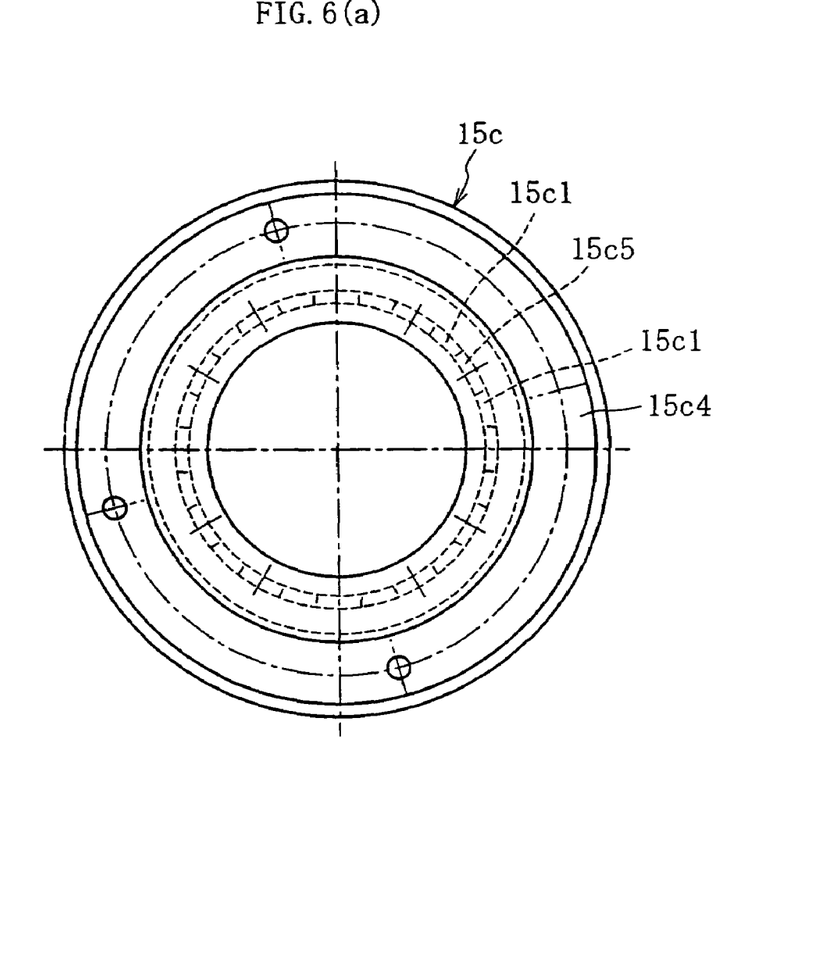
FIGS. 6(a) and 6(b) are a plan view and a sectional view, respectively, showing an inner stator of the disintegrator mechanism.
Figure 6B:
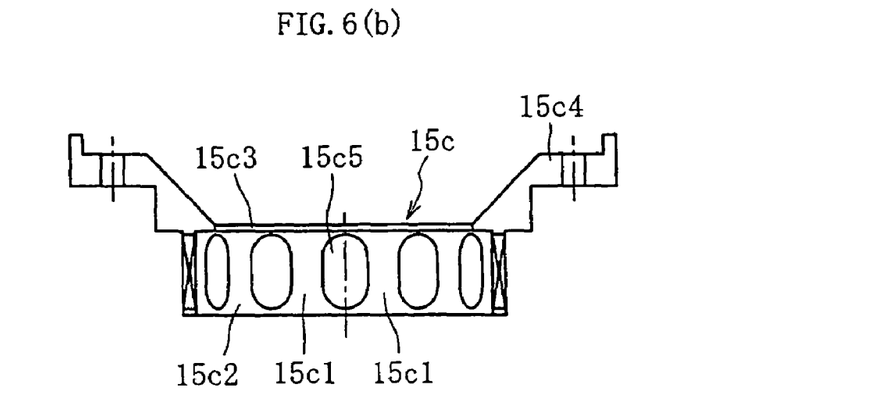

As shown in FIG. 6, the inner stator 15c includes multiple teeth 15c1 arranged at a predetermined circumferential interval, a lower annular portion 15c2 integrally connecting the lower ends of respective teeth 15c1, an upper annular portion 15c3 integrally connecting the upper ends of respective teeth 15c1, and a flange 15c4 provided integrally with the upper annular portion 15c3. A window-like space 15c5 is formed between circumferentially adjacent teeth 15c1, 15c1. The pitch diameter of the teeth 15c1 of the inner stator 15c is smaller than the pitch diameter of the teeth 15b1 of the outer stator 15b.

Figure 7:
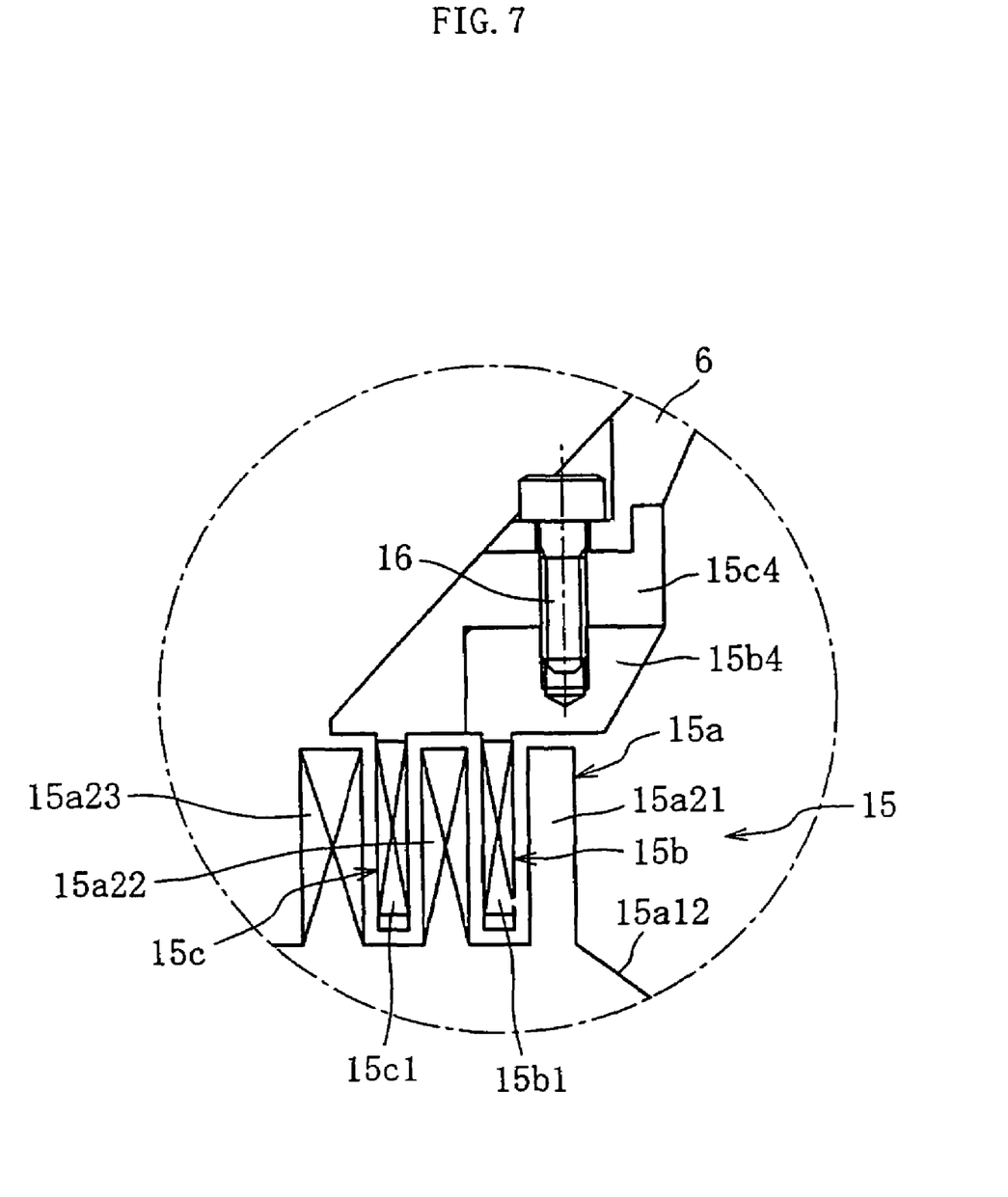
FIG. 7 is an enlarged sectional view showing the disintegrator mechanism.

As shown in FIG. 7, the outer stator 15b and the inner stator 15c are fixed to the lower end portion of the draft tube 6 with a bolt 16 such that the teeth 15c1 are incorporated into position on the inner peripheral side with respect to the teeth 15b1, with the flange 15b4 being abutted on the lower surface of the flange 15c4. In this state, the teeth 15b1 of the outer stator 15b are inserted in between the outer teeth 15a21 and the intermediate teeth 15a22 of the rotor 15a through the intermediation of a predetermined gap therebetween, and the teeth 15c1 of the inner stator 15c are inserted in between the intermediate teeth 15a22 and the inner teeth 15a23 of the rotor 15a through the intermediation of a predetermined gap therebetween.

As the rotary shaft 5c rotates and the rotor 15a rotates at high speed relative to the outer stator 15b and the inner stator 15c, powder is sucked into the disintegrator mechanism 15 due to a turbulence effect accompanying the rotation of the rotor 15a. Then, due to the centrifugal force accompanying the rotation of the rotor 15a, the powder thus sucked in is pushed radially outwards from the gap defined by the outer teeth 15a21, intermediate teeth 15a22, and inner teeth 15a23 of the rotor 15a, the teeth 15b1 of the outer stator 15b, and the teeth 15c1 of the inner stator 15c. As this happens, the portions of the powder particles forming secondary agglomerates or aggregates are disintegrated into single particles or particles of a predetermined particle size.

Figure 3:
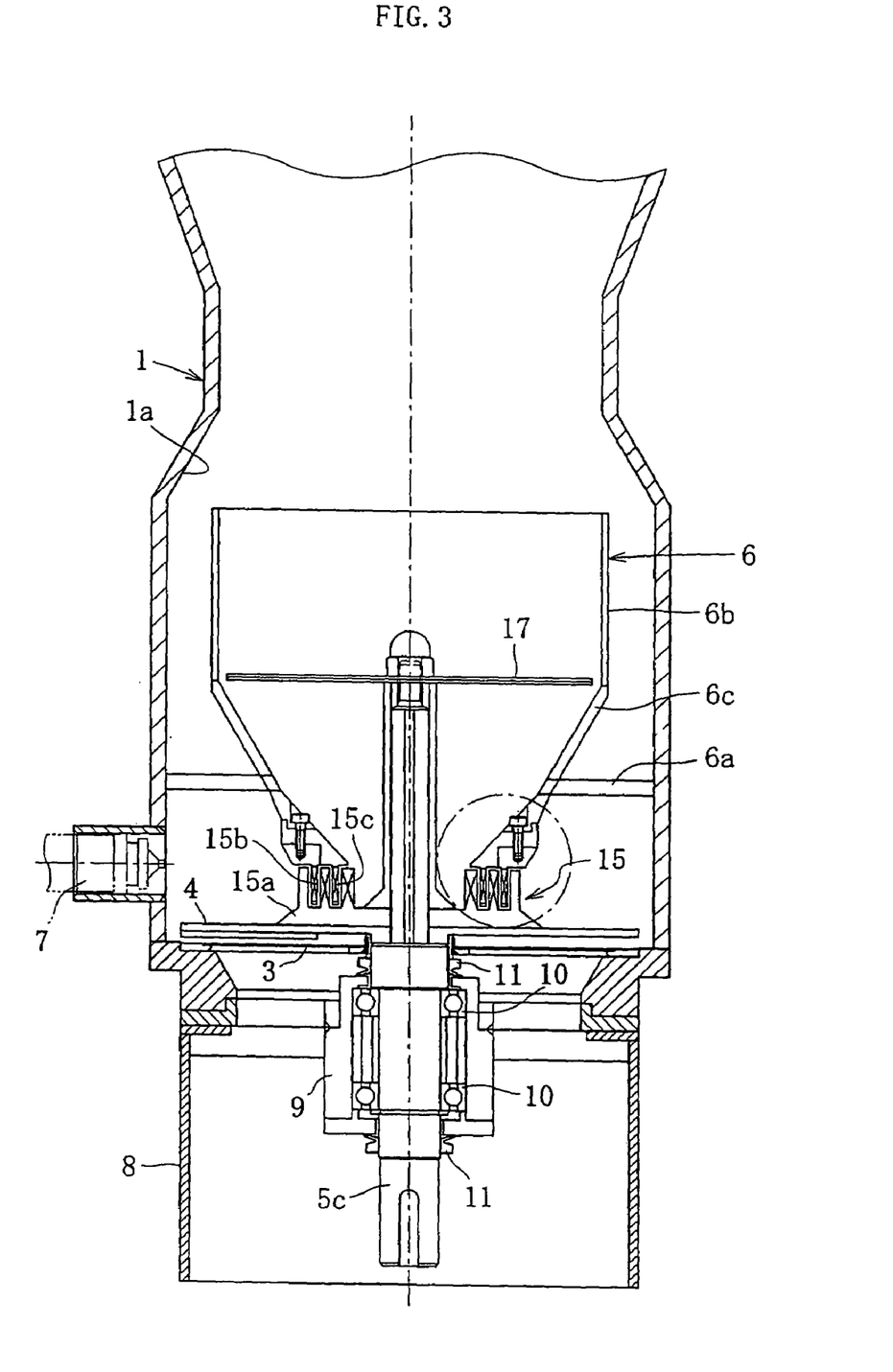
FIG. 3 is a sectional view showing a fluidized bed apparatus according to another embodiment of the present invention.
Figure 4A:
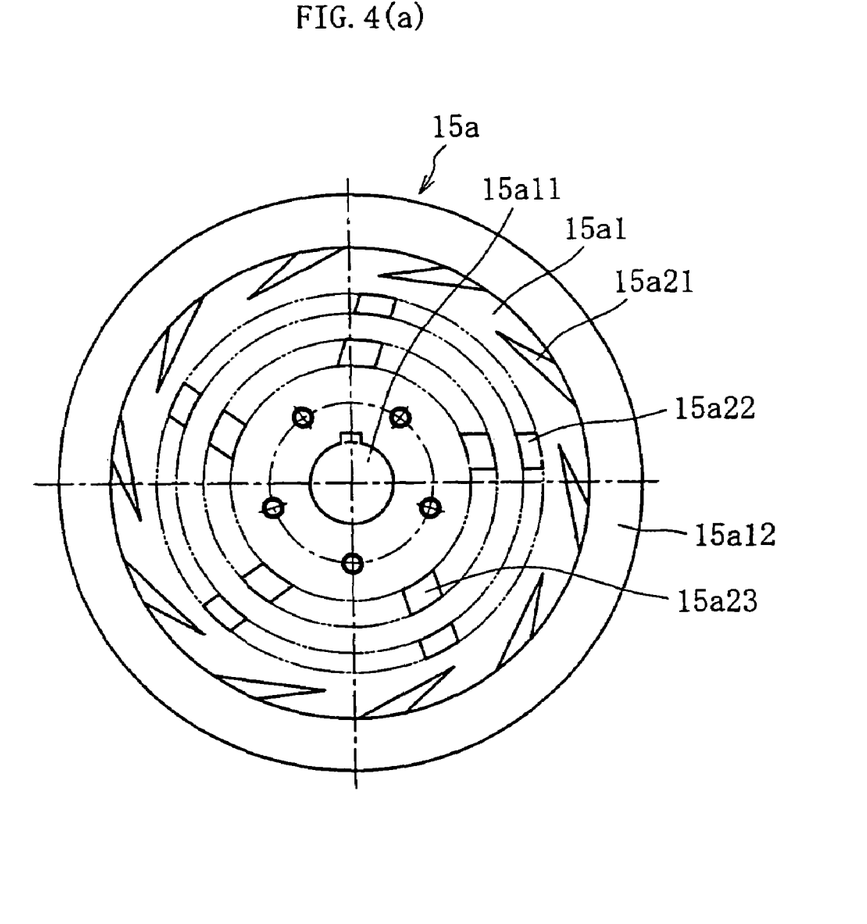
FIGS. 4(a) and 4(b) are a plan view and a sectional view, respectively, showing a rotor of a disintegrator mechanism.
Figure 4B:
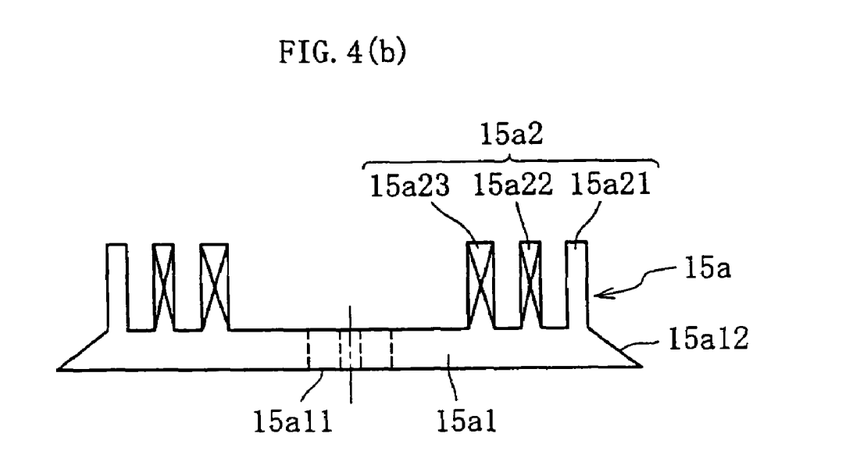
Figure 5A:
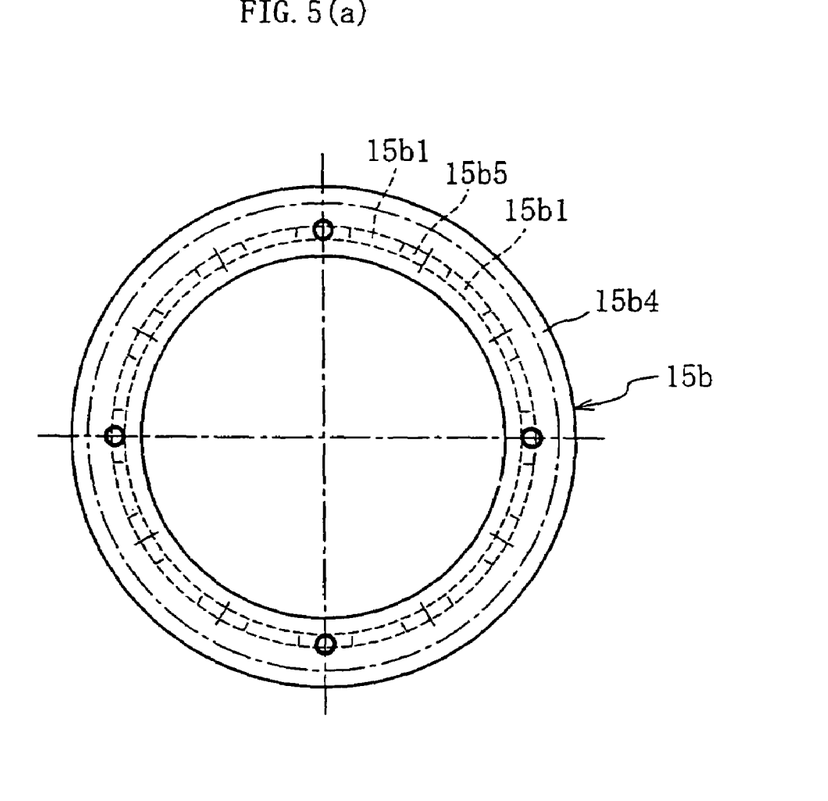
FIGS. 5(a) and 5(b) are a plan view and a sectional view, respectively, showing an outer stator of the disintegrator mechanism.
Figure 5B:
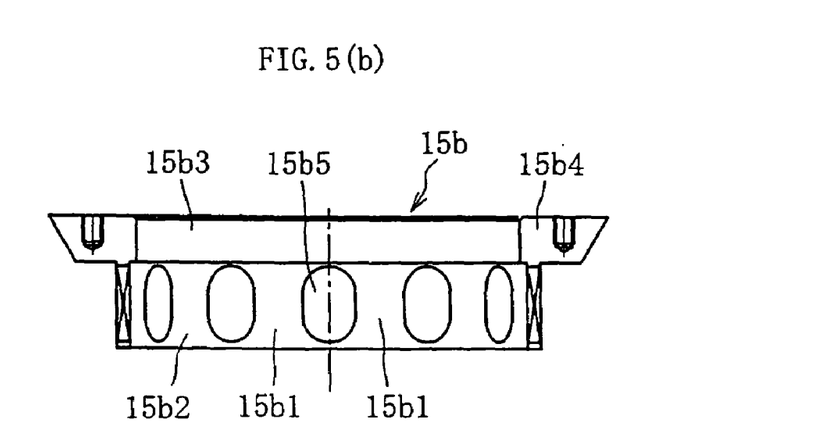

After passing the disintegrator mechanism 15, the powder particles are returned by the centrifugal force of the rotary rotor 4 to the upward current ascending in the space between the outer periphery of the draft tube 6 and the inner wall of the processing container 1. In this embodiment, the tapered surface 15a12 is provided in the outer peripheral portion of the rotor 15a, whereby the powder particles having passed the disintegrator mechanism 15 can be smoothly carried onto the upper surface of the rotary rotor 4 due to the guiding action of the tapered surface 15a12.

Further, in this embodiment, a vane-like member 17, which generates an up-to-down flow of air current as it rotates, is fitted to an upper end portion of the rotary shaft 5c. The turbulence effect of the disintegrator mechanism 15 combined with the sucking action of the air current generated by the rotation of the vane-like member 17 makes it possible to effectively suck the powder particles in the vicinity of the upper end portion of the draft tube 6 into the draft tube 6.

Further, in this embodiment, a conical tapered guide surface 1a with a diameter gradually decreasing upwards is provided on the inner wall portion of the processing container 1 which is situated near the upper end portion of the draft tube 6. The powder particles are guided by the conical taped surface 1a toward the draft tube 6 as they ascend while being carried on the upward current ascending in the space between the outer periphery of the draft tube 6 and the inner wall of the processing container 1, thereby enabling the powder particles to smoothly flow into the draft tube 6.

Otherwise, this embodiment is of the same construction as the embodiment as illustrated in FIGS. 1 and 2, and hence repetitive description is omitted here. Further, in FIG. 3, the components or portions that are substantially identical to the components or portions denoted by symbols in FIGS. 1 and 2 are denoted by the same symbols.

The invention claimed is:

1. A fluidized bed apparatus used for coating processing or granulation processing of powder particles, comprising a processing container, a draft tube arranged inside the processing container, and a disintegrator mechanism for dispersing agglomerates of powder particles by a mechanical disintegration force, wherein a fluidizing gas introduced through a bottom portion of the processing container causes powder particles in the processing container to form a fluidized bed in which the powder particles circulate so as to ascend through a space between an inner wall of the processing container and the draft tube, and descend through an inner portion of the draft tube, and agglomerates of the powder particles descending through the inner portion of the draft tube are dispersed by the disintegrator mechanism, and wherein the fluidized bed apparatus further comprises a rotary rotor for sending the powder particles that have passed the disintegrator mechanism to an upward current of the fluidizing gas by centrifugal force.

2. A fluidized bed apparatus used for coating processing or granulation processing of powder particles according to claim 1, wherein the disintegrator mechanism comprises an impeller having a disintegrator blade.

3. A fluidized bed apparatus used for coating processing or granulation processing of powder particles according to claim 2, wherein the disintegrator mechanism further comprises a screen arranged at a predetermined gap from the disintegrator blade of the impeller.

4. A fluidized bed apparatus used for coating processing or granulation processing of powder particles according to claim 1, wherein the disintegrator mechanism comprises a rotor and a stator each having a plurality of concentrically arranged teeth.

5. A fluidized bed apparatus used for coating processing or granulation processing of powder particles according to claim 1, wherein the fluidized bed apparatus comprises a spray nozzle for spraying a spray solution to the powder particles fluidizing and circulating in the processing container.

6. A fluidized bed apparatus used for coating processing or granulation processing of powder particles according to claim 5, wherein the spray nozzle is arranged such that the spray nozzle can spray the spray solution to the powder particles that have passed the disintegrator mechanism.

* * * * *